United States Patent
Buys et al.

(10) Patent No.: US 11,455,771 B2
(45) Date of Patent: Sep. 27, 2022

(54) VENUE SURVEY USING UNMANNED AERIAL VEHICLE

(71) Applicant: Electronic Theatre Controls, Inc., Middleton, WI (US)

(72) Inventors: Koen Buys, Hofstade (BE); Joshua Jordan, Middleton, WI (US); Timothy P. Nolan, Madison, WI (US)

(73) Assignee: Electronic Theatre Controls, Inc., Middleton, WI (US)

(*) Notice: Subject to any disclaimer, the term of this patent is extended or adjusted under 35 U.S.C. 154(b) by 363 days.

(21) Appl. No.: 16/874,900

(22) Filed: May 15, 2020

(65) Prior Publication Data

US 2020/0364930 A1 Nov. 19, 2020

Related U.S. Application Data

(60) Provisional application No. 62/848,129, filed on May 15, 2019.

(51) Int. Cl.

| G06T 17/00 | (2006.01) |
| G06T 17/05 | (2011.01) |
| G06T 19/00 | (2011.01) |
| G06T 15/50 | (2011.01) |
| B64C 39/02 | (2006.01) |
| B64D 47/02 | (2006.01) |
| B64D 47/08 | (2006.01) |
| G05D 1/00 | (2006.01) |
| G05D 1/10 | (2006.01) |
| H05B 47/19 | (2020.01) |
| G06V 20/10 | (2022.01) |
| G06V 30/262 | (2022.01) |

(52) U.S. Cl.
CPC ............ *G06T 17/05* (2013.01); *B64C 39/024* (2013.01); *B64D 47/02* (2013.01); *B64D 47/08* (2013.01); *G05D 1/0094* (2013.01); *G05D 1/101* (2013.01); *G06T 15/50* (2013.01); *G06T 19/003* (2013.01); *G06V 20/10* (2022.01); *G06V 30/274* (2022.01); *H05B 47/19* (2020.01); *B64C 2201/027* (2013.01); *B64C 2201/127* (2013.01); *B64C 2201/141* (2013.01); *G06T 2200/08* (2013.01); *G06T 2200/24* (2013.01)

(58) Field of Classification Search
None
See application file for complete search history.

(56) References Cited

U.S. PATENT DOCUMENTS

| 8,587,583 | B2 | 11/2013 | Newcombe et al. |
| 9,152,863 | B1* | 10/2015 | Grant ..................... G06Q 10/20 |
| 9,513,635 | B1 | 12/2016 | Bethke et al. |
| 10,032,078 | B2* | 7/2018 | Schultz .................. H04N 21/47 |
| 10,059,459 | B2* | 8/2018 | Clark ..................... G05D 1/0072 |

(Continued)

*Primary Examiner* — Martin Mushambo
(74) *Attorney, Agent, or Firm* — Michael Best & Friedrich LLP

(57) ABSTRACT

A method of surveying a venue includes scanning at least a portion of the venue using an unmanned aerial vehicle having at least one scanner, converting scan data gathered by the at least one scanner into three-dimensional location data, displaying the three-dimensional location data as a three-dimensional model, analyzing the three-dimensional model, and designating portions of the three-dimensional model with semantic mapping.

20 Claims, 10 Drawing Sheets
(3 of 10 Drawing Sheet(s) Filed in Color)

(56) References Cited

U.S. PATENT DOCUMENTS

| | | | | |
|---|---|---|---|---|
| 10,074,183 B1* | 9/2018 | Watson | ............... | G06T 7/62 |
| 10,157,501 B2* | 12/2018 | Pilskalns | ............... | G06T 19/003 |
| 10,227,134 B2* | 3/2019 | Priest | ............... | H04W 16/18 |
| 10,329,017 B2* | 6/2019 | Noto | ............... | G05D 1/0094 |
| 10,353,401 B2* | 7/2019 | Tan | ............... | G08G 5/0086 |
| 10,364,027 B2* | 7/2019 | Loveland | ............... | H04N 5/23299 |
| 10,416,683 B2* | 9/2019 | Adriazola | ............... | G05D 1/0094 |
| 10,431,103 B2* | 10/2019 | Murphy | ............... | G08G 5/0034 |
| 10,633,093 B2* | 4/2020 | Castillo-Effen | ............... | G06T 19/003 |
| 10,970,586 B2* | 4/2021 | Tan | ............... | G06V 10/761 |

* cited by examiner

VENUE SURVEY USING UNMANNED AERIAL VEHICLE

RELATED APPLICATIONS

This application claims the benefit of U.S. Provisional Application No. 62/848,129, filed May 15, 2019, the entire content of which is hereby incorporated by reference.

FIELD

Embodiments described herein relate to surveying an environment.

SUMMARY

It would be beneficial to be able to map a venue, including a stage, in three dimensions. The information gathered from mapping the venue can be used to create a three-dimensional ("3D") model of the venue in a digital form. Such digital 3D models could be used in interactive digital environments.

Currently, a user must physically measure the dimensions of a venue with manual tools, such as a measuring tape, in order to accurately gather dimension data of the venue. The user must then keep this dimension data written down or memorized in order to use it for determining lighting arrangements and the like. The dimension data is difficult to visualize when not viewing the venue itself, and creating a representation of the venue, digital or otherwise, would be prohibitively time consuming due to the number of measurements that must be made and recorded by hand. To make the use of such an interactive three-dimensional environment practical, however, the dimension data must be gathered more quickly and easily than what can be done by hand.

For large venues in particular, some features to be surveyed and mapped may be prohibitively high off the ground. Approaching these features would typically require special equipment, such as an aerial work platform (e.g., a "cherry picker") or scaffolding, because a ladder cannot safely reach beyond a predetermined height. Personnel trained in the use of the special equipment is then required, and risk of injury is increased.

Accordingly, to address these and other technical problems, a system and method for surveying and mapping a venue, including a stage, are implemented to gather multiple data points in a fraction of the time it would take one or more individuals to measure the venue by hand. These data points could then be imported into a specialized 3D modeling software in the form of an interactive three-dimensional venue model that alters its display based on user input. This model is then used to control one or more lights; identify areas for seating, set pieces, and other utilities; measure dimensions, clearances, and other restricted or keep-out areas; locate rigging points; determine lighting fixture arrangement; determine lighting fixture operational capabilities; monitor airflow through the venue; measure acoustic properties of the venue; or the like.

Methods described herein for surveying a venue include scanning at least a portion of the venue using an unmanned aerial vehicle having at least one scanner, converting scan data gathered by the at least one scanner into three-dimensional location data, displaying the three-dimensional location data as a three-dimensional model, analyzing the three-dimensional model, and designating portions of the three-dimensional model with semantic mapping.

Systems described herein for surveying a venue include an unmanned aerial vehicle, at least one sensor connected to the unmanned aerial vehicle, and a controller. The controller directs the unmanned aerial vehicle about the venue, operates the at least one sensor to gather sensor data, receives a signal from the at least one sensor related to the sensor data, translates the sensor data into three-dimensional location data, outputs a display of the three-dimensional location data as a three-dimensional model, and executes semantic mapping of the three-dimensional model.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Embodiments described herein relate to gathering data points of a venue relating to a number of different features of the venue using an unmanned aerial vehicle ("UAV"). Some embodiments further relate to gathering dimension data of a venue and utilizing the dimension data to create an interactive three-dimensional environment to control lights associated with the venue in an intuitive and accurate manner. Some embodiments also relate to surveying the venue to find important physical features with regard to lighting capabilities and other effects capabilities to more fully understand the venue. The information gathered in the survey could also be loaded into the interactive three-dimensional environment for effects experimentation.

Figure 1:
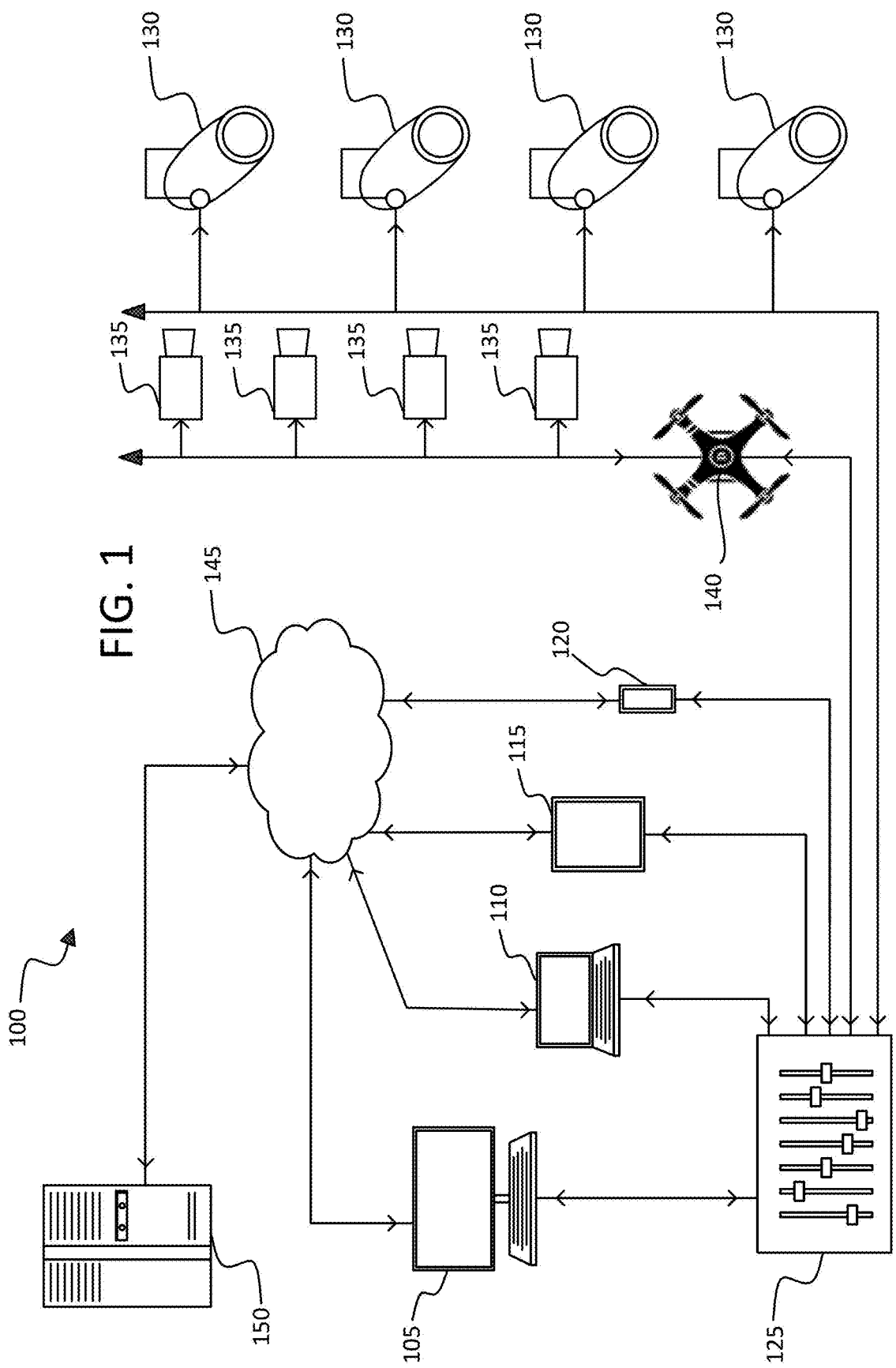
FIG. 1 schematically illustrates a system for surveying and mapping a venue in three dimensions.

FIG. 1 illustrates a system 100 for gathering data related to a venue including a stage and controlling lighting fixtures 130 according to the data. The system 100 is provided as an example and, in some embodiments, the system 100 includes additional components. The illustrated system 100 includes a user input device 105-120, a control board or control panel 125, at least one lighting fixture 130, at least one sensor (such as a camera) 135 of a UAV 140 (discussed further below), a communications network 145, and a server-side mainframe computer or server 150. The user input device 105-120 includes, for example, a personal or desktop computer 105, a laptop computer 110, a tablet computer 115, or a mobile phone (e.g., a smart phone) 120. Other user input devices may include, for example, an augmented reality headset or glasses.

The user input device 105-120 is configured to communicatively connect to the server 150 through the network 145 and provide information to, or receive information from, the server 150 related to the control or operation of the system 100. The user input device 105-120 is also configured to communicatively connect to the control board 125 to provide information to, or receive information from, the control board 125. The connections between the user input device 105-120 and the control board 125 or network 145 are, for example, wired connections, wireless connections, or a combination of wireless and wired connections. Similarly, the connections between the server 150 and the network 145, the control board 125 and the lighting fixtures 130, the control board 125 and the UAV 140, or the UAV 140 and the sensors 135 are wired connections, wireless connections, or a combination of wireless and wired connections.

The network 145 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 145 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 1A:
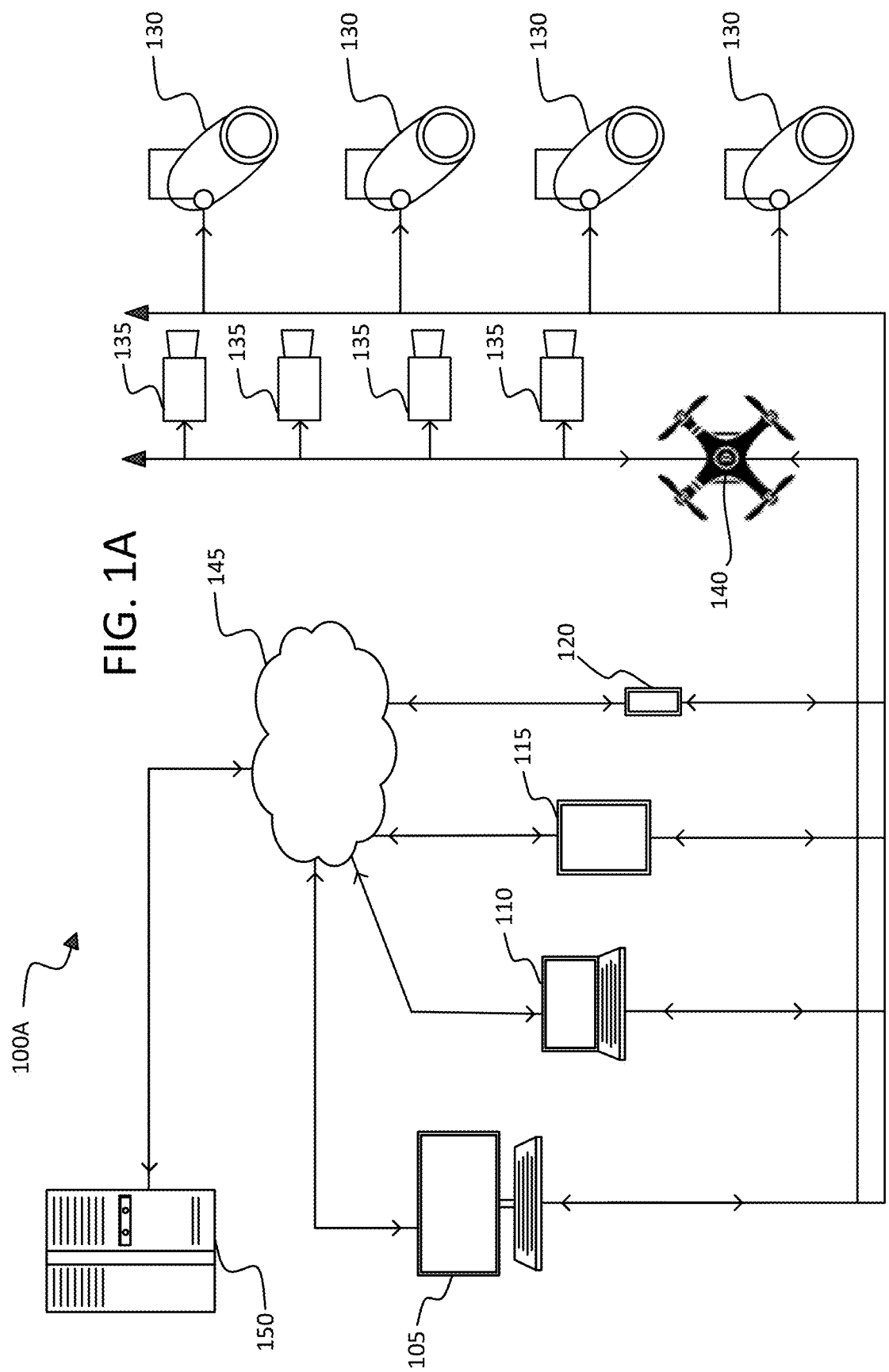
FIG. 1A schematically illustrates an alternative system for surveying and mapping a venue in three dimensions.

FIG. 1A illustrates an alternative system 100A for gathering data related to a venue including a stage and controlling lighting fixtures 130 according to the data. The hardware of the alternative system 100A is identical to the above system 100 in every way, except the control board or control panel 125 is omitted. As such, the user input device 105-120 is configured to communicatively connect to the lighting fixtures 130 and to the UAV 140. The connections between the user input device 105-120 and the lighting fixtures 130 and the connections between the user input device 105-120 and the UAV 140 are wired connections, wireless connections, or a combination of wireless and wired connections.

Figure 2:
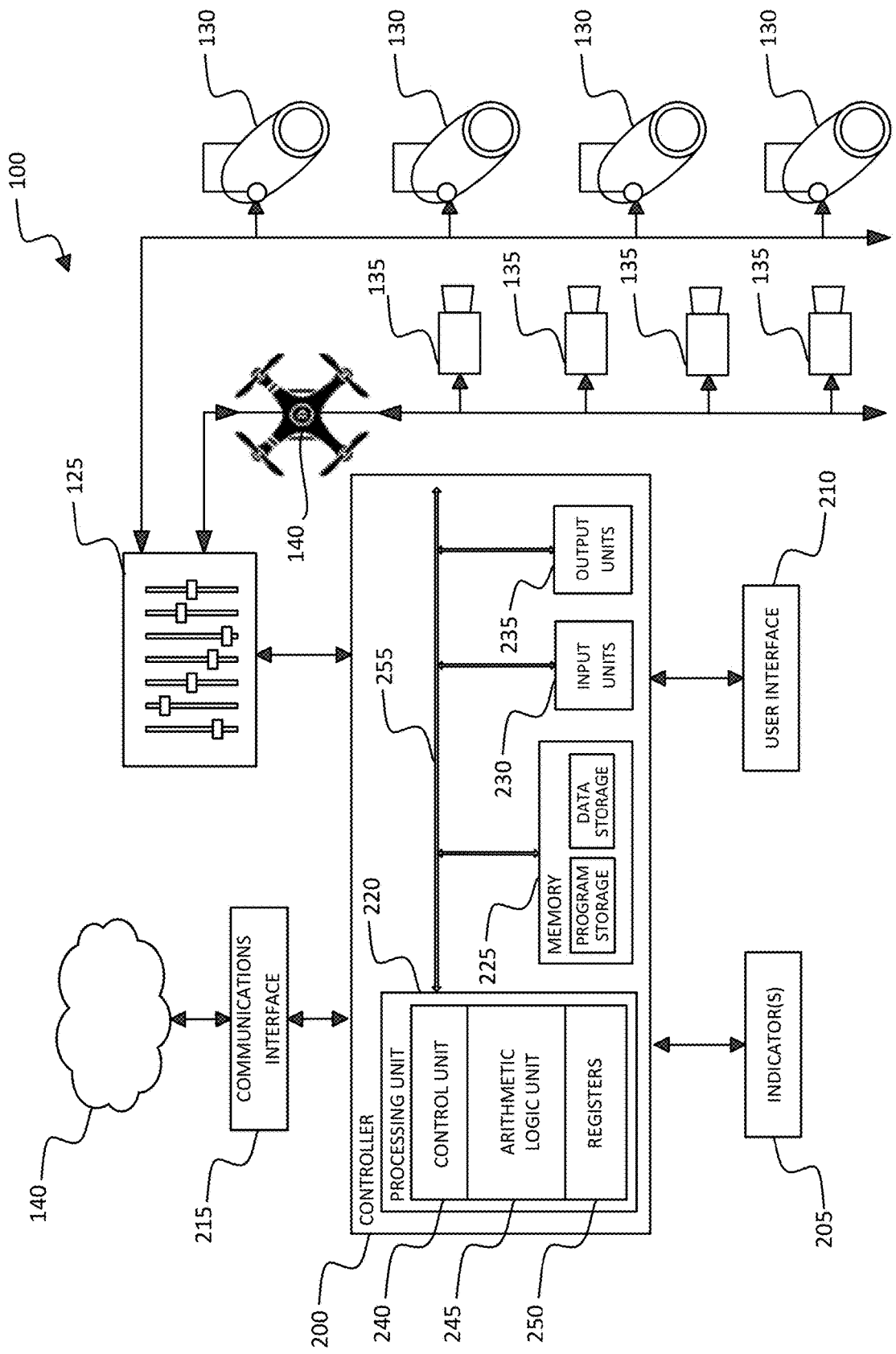
FIG. 2 illustrates a controller for the system of FIG. 1.

FIG. 2 illustrates a controller 200 for the system 100. The controller 200 is electrically and/or communicatively connected to a variety of modules or components of the system 100. For example, the illustrated controller 200 is connected to one or more indicators 205 (e.g., LEDs, a liquid crystal display ["LCD"], etc.), a user input or user interface 210 (e.g., a user interface of the user input device 105-120 in FIG. 1), and a communications interface 215. The controller 200 is also connected to the control board 125. The communications interface 215 is connected to the network 145 to enable the controller 200 to communicate with the server 150. The controller 200 includes combinations of hardware and software that are operable to, among other things, control the operation of the system 100, control the operation of the lighting fixture 130, control the operation of the UAV 140, receive one or more signals from the UAV 140, communicate over the network 145, communicate with the control board 125, receive input from a user via the user interface 210, provide information to a user via the indicators 205, etc. In some embodiments, the indicator 205 and the user interface 210 may be integrated together in the form of, for instance, a touch-screen.

In the embodiment illustrated in FIG. 2, the controller 200 would be associated with the user input device 105-120. As a result, the controller 200 is illustrated in FIG. 2 as being connected to the control board 125 which is, in turn, connected to the lighting fixture 130 and the UAV 140. In other embodiments, the controller 200 is included within the control board 125, and, for example, the controller 200 can provide control signals directly to the lighting fixture 130 and the UAV 140. In other embodiments, the controller 200 is associated with the server 150 and communicates through the network 145 to provide control signals to the control board 125, the lighting fixture 130, and the UAV 140.

The controller 200 includes a plurality of electrical and electronic components that provide power, operational control, and protection to the components and modules within the controller 200 and/or the system 100. For example, the controller 200 includes, among other things, a processing unit 220 (e.g., a microprocessor, a microcontroller, or another suitable programmable device), a memory 225, input units 230, and output units 235. The processing unit 220 includes, among other things, a control unit 240, an arithmetic logic unit ("ALU") 245, and a plurality of registers 250 (shown as a group of registers in FIG. 2), and is implemented using a known computer architecture (e.g., a modified Harvard architecture, a von Neumann architecture, etc.). The processing unit 220, the memory 225, the input units 230, and the output units 235, as well as the various modules or circuits connected to the controller 200 are connected by one or more control and/or data buses (e.g., common bus 255). The control and/or data buses are shown generally in FIG. 2 for illustrative purposes. The use of one or more control and/or data buses for the interconnection between and communication among the various modules, circuits, and components would be known to a person skilled in the art in view of the invention described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 220 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the system 100 and controller 200 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The user interface 210 is included to provide user control of the system 100, the lighting fixture 130, and/or the UAV 140. The user interface 210 is operably coupled to the controller 200 to control, for example, drive signals provided to the lighting fixture 130 and/or drive signals provided to the UAV 140. The user interface 210 can include any combination of digital and analog input devices required to achieve a desired level of control for the system 100. For example, the user interface 210 can include a computer having a display and input devices, a touch-screen display, a plurality of knobs, dials, switches, buttons, faders, or the like. In the embodiment illustrated in FIG. 2, the user interface 210 is separate from the control board 125. In other embodiments, the user interface 210 is included in the control board 125.

The controller 200 is configured to work in combination with the control board 125 to provide direct drive signals to the lighting fixtures 130 and/or the UAV 140. As described above, in some embodiments, the controller 200 is configured to provide direct drive signals to the lighting fixtures 130 and/or the UAV 140 without separately interacting with the control board 125 (e.g., the control board 125 includes the controller 200). The direct drive signals that are provided to the lighting fixtures 130 and/or the UAV 140 are provided, for example, based on a user input received by the controller 200 from the user interface 210. The controller 200 is also configured to receive one or more signals from the camera(s) 135 related to scan data through communication with the UAV 140.

Figure 2A:
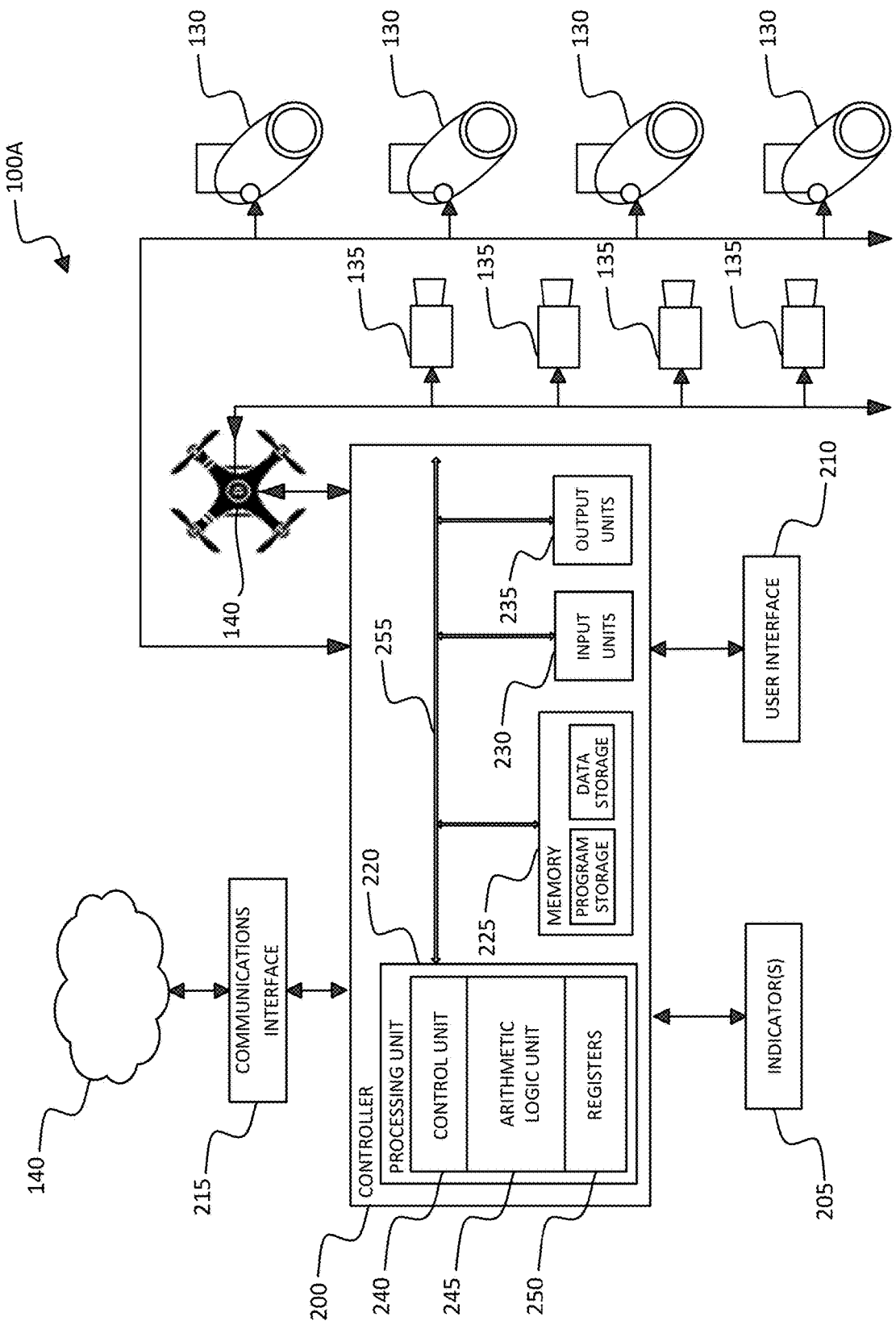
FIG. 2A illustrates a controller for the system of FIG. 1A.

As shown in FIG. 2A and described above, the system 100A includes the controller 200 configured to work without the control board 125, such that the controller 200 is configured to provide signals to the lighting fixtures 130 and/or the UAV 140 and to receive one or more signals from the camera(s) 135 related to scan data through communication with the UAV 140.

Figure 3:
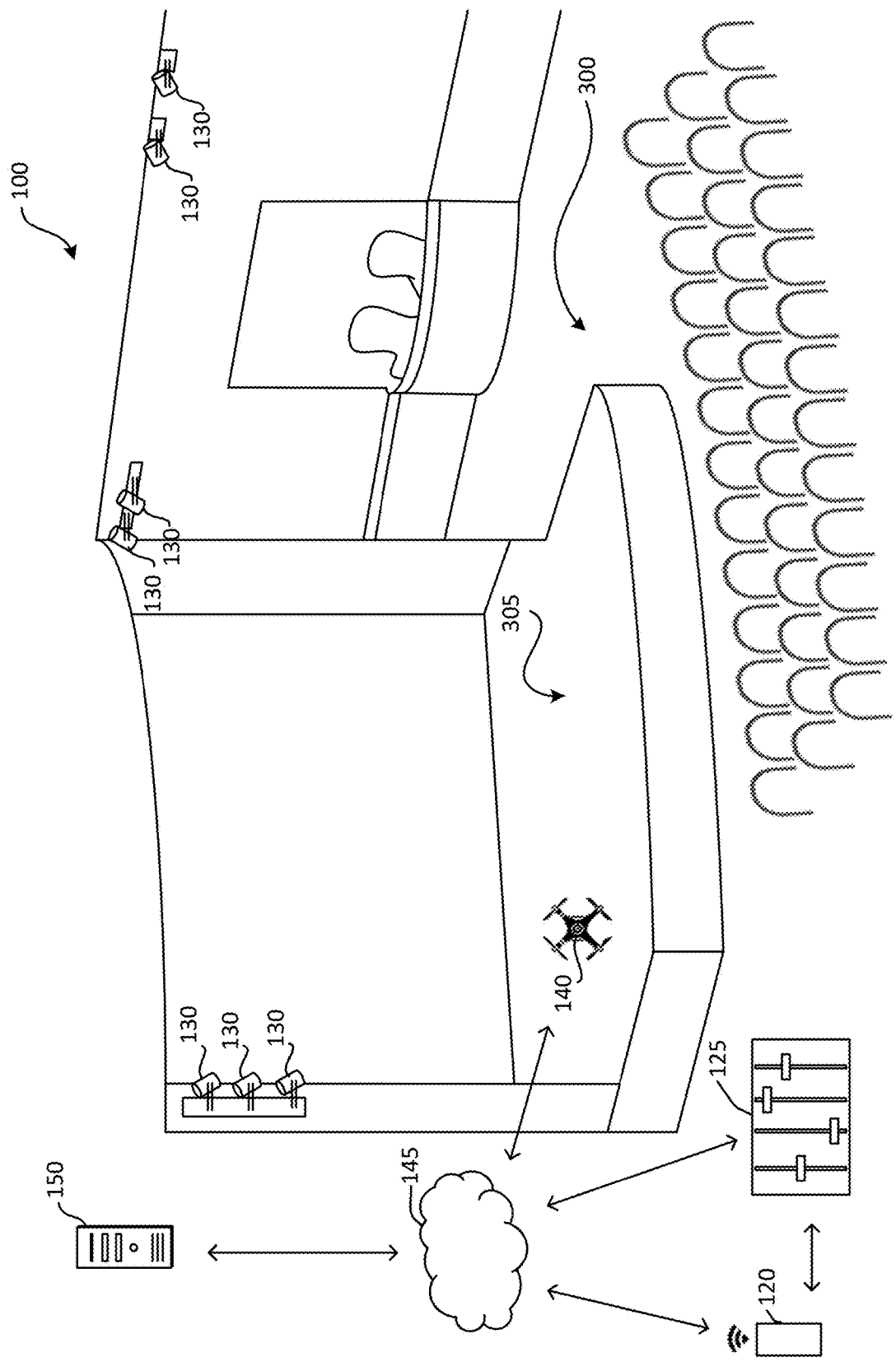
FIG. 3 illustrates an unmanned aerial vehicle of the system of FIG. 1 in a venue.

FIG. 3 illustrates the control board 125, the lighting fixtures 130, the UAV 140, and the user input device 120 of the system 100 in a venue 300 including a stage 305.

Figure 3A:
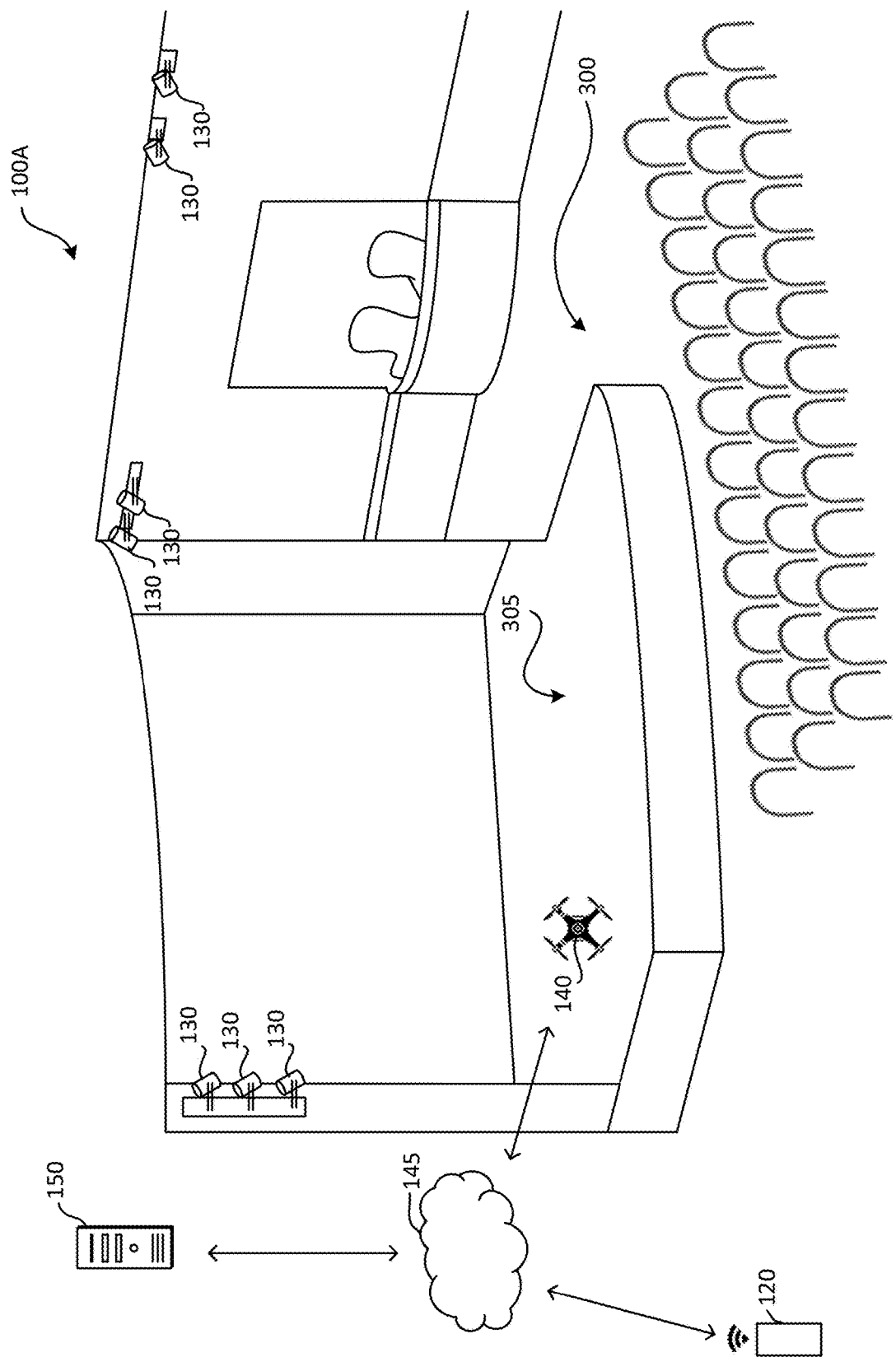
FIG. 3A illustrates an unmanned aerial vehicle of the system of FIG. 1A in a venue.

FIG. 3A illustrates the system 100A in a venue 300 including a stage 305. As discussed above, the system 100A omits the control board 125, and the user input device 120 is configured to directly communicate with the lighting fixtures 130 and the UAV 140.

The controller 200 receives signals from the sensors/cameras 135 aboard the UAV 140. The controller 200 also processes the signals and interprets the same as input data related to the dimensions and location of the stage 305 and other features of the venue 300. The controller 200 outputs a display of the venue 300 representing the dimension and location data to, for instance, the indicators 205. The controller 200 receives user input regarding user selected lighting visuals and lighting settings to be used via, for instance, the user interface 210. The indicators 205 further display the stage in an interactive three-dimensional environment as being altered aesthetically by the selected lighting visuals/lighting settings. The controller 200 outputs a command signal based on the entered lighting preferences. The controller 200 also controls the lighting fixtures 130 according to the command signal either directly or through the control panel 125. The controller 200 further communicates with the UAV 140 to command, for instance, movement and activation of the UAV 140.

The UAV 140 includes, for instance, drones, remote-control helicopters, quad-copters, airplanes, balloons, and the like. Non-aerial vehicles including, for instance, wheeled or tracked ground vehicles, floating water vehicles, submersible water vehicles, and the like can also be used as part of the system 100, 100A. The sensors/cameras 135 aboard the UAV 140 detect characteristics of the venue 300. These sensors 135 include, but are not limited to, electro-optic sensors, infrared sensors, cameras, RF sensors, audio sensors, airflow sensors, air pressure sensors, temperature sensors, thermal imagers, range sensors, LIDAR sensors, GPS sensors, gyroscopes, accelerometers, motor sensors, depth cameras, orientation sensors (such as an inertial measurement unit ["IMU"]), compasses, and the like. Each sensor 135 may be fixedly connected to the UAV 140 or may be movable relative to the UAV 140 on, for instance, a motorized gimbal.

The UAV 140 is controlled in a variety of possible ways, including through active user decisions, an autopilot control program, some combination thereof, or the like. The control signal sent to the UAV 140 is transmitted from the controller 200 or a dedicated UAV control device. Some embodiments include the UAV 140 including self-control capabilities implemented by components housed on or within the UAV 140 itself.

In a fully manual mode, the user can control the UAV 140 to move in real-time or nearly real-time with controls displayed on the user input device 120. In some embodiments, the user views a live or nearly live feed from the cameras 135 mounted to the UAV 140. In such embodiments, the user is able to pilot the UAV 140 even when a line of sight from the user to the UAV 140 is obstructed. In the fully manual mode, the user further commands activation of the sensors 135 aboard the UAV 140 to gather data with regard to the venue 300.

In an autopilot mode, the user places the UAV 140 somewhere to act as a takeoff and landing location, such as on the stage 305. The UAV 140 logs this position as a reference location immediately upon startup when the user turns on the UAV 140, in response to a command from the user via the user interface 210, or when recognizing the UAV 140 has not moved after a threshold period of time through data gathered by the sensors 135 aboard the UAV 140. The UAV 140 automatically returns to this reference position after completing the survey of the venue 300. In the autopilot mode, the user inputs initial information, such as the general dimensions of the venue 300 including ceiling height and distance between walls representing a geofence. This information is input as part of a general flight plan for the UAV 140.

In some embodiments, the UAV 140 takes off from the stage 305 and travels in a first direction (e.g., upwardly) until the sensors 135 aboard the UAV 140 detect an obstruction (such as the ceiling or a lighting fixture 130). Upon detecting the obstruction, the UAV 140 further initializes other appropriate sensors 135 to fully scan the obstruction, thereby conserving battery life by not constantly utilizing all sensors 135 aboard the UAV 140. Other embodiments of the system 100, 100A include all the sensors 135 aboard the UAV 140 being constantly active or periodically active regardless of the location of the UAV 140 while the UAV 140 is on. Once an obstruction is detected and the UAV 140 has finished scanning the obstruction with the sensors 135, the UAV 140 moves in a second direction (e.g., horizontally) to search for another obstruction to scan. In some embodiments, the UAV 140 follows along the surfaces of the first encountered obstruction and scans it with its sensors 135. In these embodiments, the UAV 140 moves in a grid-like pattern along the ceiling or in an outwardly spiraling pattern from the location of first encountering the obstruction. Some embodiments include sensors 135 connected to the UAV 140 via a gimbal. Such sensors 135 are adjusted such that encountered obstructions are scanned directly, obliquely, or some combination thereof with multiple passes. Other embodiments include reference tags or other designated locations on structures located within the venue 300. These reference tags are recognizable through scanning done by the sensors 135 aboard the UAV 140.

In either the manual control mode or the autopilot mode, the sensors 135 aboard the UAV 140 scan as needed to capture the features of the venue 300. In some embodiments, the sensors 135 capture data on a periodic basis determined by a user and input via the user interface 210. This data gathered during the operation of the UAV 140 as it travels about the venue 300 can be used to control the UAV 140 as discussed above, but the data may also be used as an estimation aid for offline processing of the data after the UAV 140 has finished traveling about the venue 300.

Other embodiments include the user deciding and controlling each instance of sensor activation via the user interface 210. The sensors 135 capture real-world information in the venue 300 indicating the shape and location of structures, temperature of the local areas in the venue 300 (e.g., temperature information), airflow changes observed during travel throughout the venue 300 (e.g., airflow information), and the like. This real-world information is stored as a series of data points along with metadata for each data point, such as time, position, and orientation of the UAV 140 (or the sensor 135 on a gimbal) using, for instance, an inertial navigation system included in the UAV 140. The use of the metadata allows the system 100, 100A to plot the data points on an absolute or relative coordinate system.

The controller 200 receives signals from the sensors 135 aboard the UAV 140 and generates a 3D model from the real-world information data points. Some embodiments pair the data points with metadata that logs at least one of a location of the UAV 140 and a time of the flightpath of the UAV 140. In some embodiments, the data points gathered while the UAV 140 is traveling about the venue 300 is sent as signals to the controller 200 to be input in the 3D model only after the UAV 140 returns to the takeoff/landing point at the end of the survey. These embodiments are beneficial where the data gathered by the sensors 135 aboard the UAV 140 is stored locally on the UAV 140. A user then plugs a wire into the UAV 140 and the user input device 120 to transmit the data much more quickly than by a wireless connection. Such embodiments also reduce the overall cost of manufacture of the UAV 140. Other embodiments include the UAV 140 sending the signals representing data points gathered by the sensors 135 to the user input device 120 to be input in the 3D model in real-time or substantially real-time during the survey of the venue 300.

The generated information includes a 3D model of the venue 300, a 3D point cloud, a digital surface model, a surface mesh, and the like. An interactive 3D model of the venue 300 is then displayed on the indicator(s) 205 using the information generated from the received sensor data. In some embodiments, the controller 200 renders the interactive 3D model altogether. Other embodiments including the UAV 140 transmitting data gathered by the sensors 135 during the operation of the UAV 140, either in real-time or near real-time, allow for the controller 200 to render the interactive 3D model piece by piece. For instance, depth cameras 135 on the UAV 140 capture images that are used to form and build up a 3D model of the venue 300 as the UAV 140 moves about the venue 300.

Figure 4:
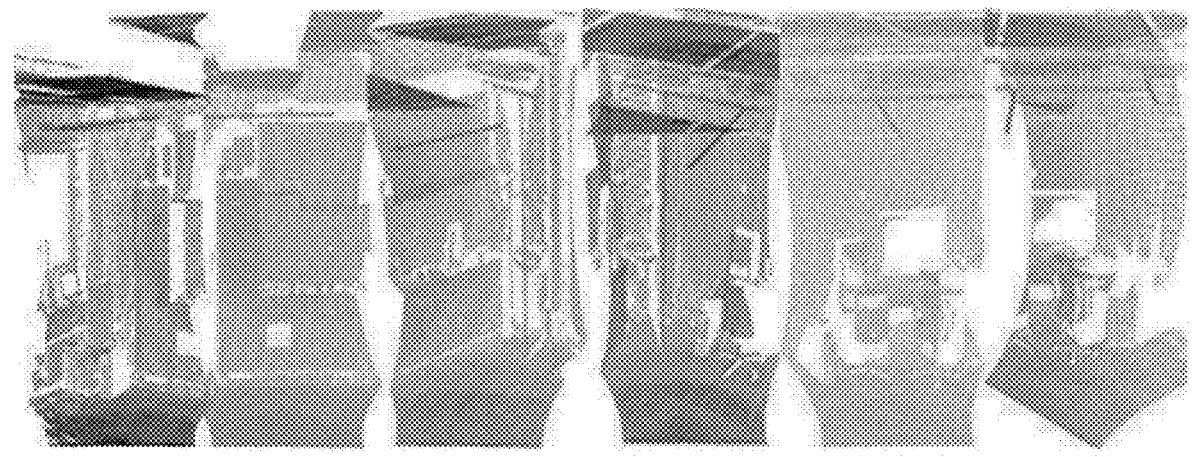
FIG. 4 illustrates and example of multiple overlapping images captured by cameras aboard the unmanned aerial vehicle.
Figure 5:
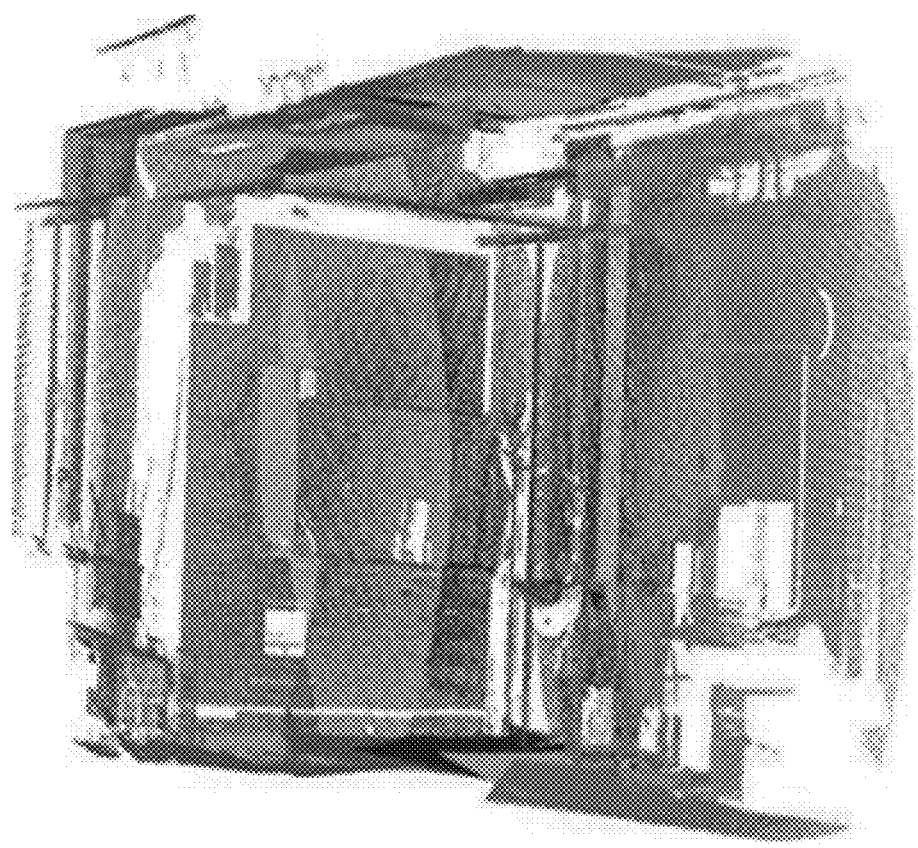
FIG. 5 illustrates the images of FIG. 4 stitched together to create a three-dimensional model of the venue.

In some embodiments, depth information captured by the depth cameras 135 on the UAV 140 is gathered in a manner including use of, for instance, time of flight, structured light, or stereo images. In some embodiments, the 3D model and the UAV autopilot mode work in tandem to track the position of the UAV 140 in relation to the 3D model being created of the venue 300. This combination of tracking and 3D modeling is known as simultaneous localization and mapping ("SLAM"). As shown in FIG. 4, multiple overlapping images are captured by the cameras 135 aboard the UAV 140. These images are stitched together (FIG. 5) to create the 3D model of the venue 300. The SLAM algorithm used to track and control the UAV 140 as it travels about the venue 300 also gathers data that provides an initial estimate of the orientation and position of the UAV 140 relative to the venue 300 for later offline processing of all the data gathered by the sensors 135 aboard the UAV 140. This initial estimate allows the calculations to approximate an error function and converge on a best estimation of the model of the venue 300.

The 3D model and the autopilot function of the UAV 140 further work together by providing feedback to the user in the form of the piece-by-piece creation of the 3D model. The in-progress 3D model is displayed on the user input device 120, for instance, allowing the user to observe the quality and progress of the 3D model. If portions of the venue 300 shown in the 3D model do not match what the user expects to see based on his own visual inspection of the venue 300, the user may flag the problem area in the 3D model via input through the user interface 210. This problem area designation received by the controller 200 allows the controller 200 to send data to the UAV 140 in the form of updated autopilot flight control signals. The flight control signals are sent to the UAV 140 to move the UAV 140 to the portion of the real world venue 300 corresponding to the problem area and to control the UAV sensors 135 to recapture data regarding that portion. The problem area may be due to any number of issues including, for instance, out of focus images, insufficient light, missed data points, signal interference, and the like. In some embodiments, the inspection of the 3D model to determine problem areas is run automatically by the controller 200 as a part of the 3D model creation instead of requiring the user's input. The controller 200 could recognize images of poor quality as being insufficient for the 3D model based on an evaluation of the continuity of a given image with adjacent images for stitching together the images (via e.g., random sample consensus and/or iterative closest point), sufficient overlap between images, distortion, and the like.

In embodiments including the controller running both the autopilot function of the UAV 140 and the creation of the 3D model simultaneously, the 3D model informs the autopilot routine of the UAV 140 when the window of a current data set is partially overlapping with that of a previous window already integrated into the 3D model. In this manner, the system 100, 100A is able to move forward through the survey operation throughout the venue 300 without depending on incremental movements alone, and the system 100, 100A recognizes when an area is complete or even when the entire survey operation is complete without input from a user.

Figure 6:
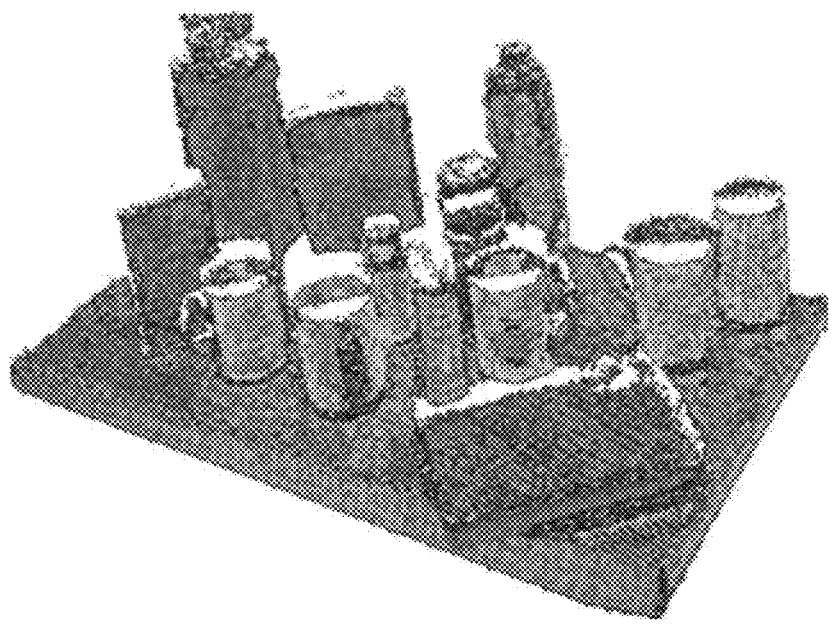
FIG. 6 illustrates an example image after performing a mesh simplification.
Figure 7:
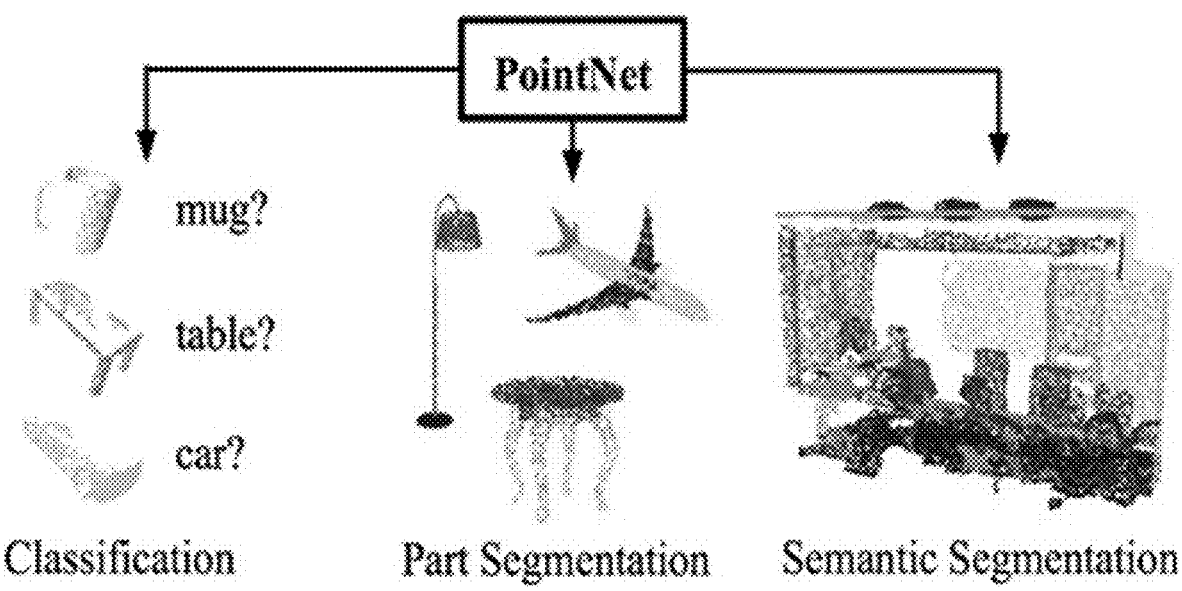
FIG. 7 schematically illustrates an example of a semantic addition process.

In addition to the above described functionality, the controller 200 is further configured to convert a pointcloud of data points gathered during the survey operation into a mesh. This mesh runs through a mesh simplification algorithm within the 3D model to look for surfaces that match known descriptors including, for instance, planes, spheres, and cylinders. The simplified mesh (shown in FIG. 6) then runs through, for instance, random sample consensus mapping, iterative closest point mapping, feature based mapping, or the like of known object descriptors. As shown in FIG. 7, the mapping software adds semantics to the map to identify, for instance, chairs, trusses, tables, lighting fixtures 130, and the like.

The data gathered and interpreted by the controller 200 via the UAV 140 allows for mapping of the entire venue 300 including mounting locations for lighting fixtures 130, lighting fixtures 130 themselves (including position and type of lighting fixtures 130), obstructions for lighting fixtures 130 with regard to lighting portions of the stage 305, and the like.

With the completed 3D model, a virtual camera can observe the 3D model and feed the views into a neural network algorithm (such as Convolutional Neural Networks with the TensorFlow framework). This algorithm can be applied to expand the semantical mapping of the items in the 3D model. The neural network algorithm is adapted to recognize many theatre specific features, common lighting plot features, how each lighting fixture 130 in a venue 300 is used, and the like.

Figure 8:
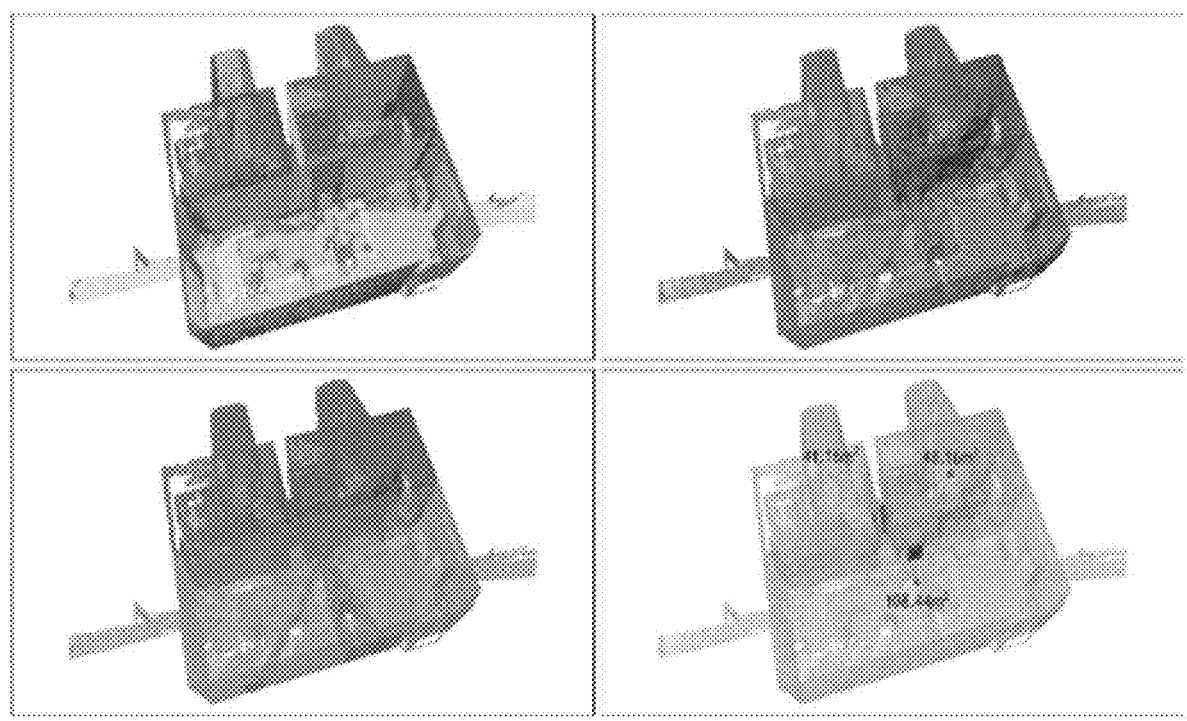
FIG. 8 illustrates an example of a completed three-dimensional model of the venue.

As shown in FIG. 8, the completed 3D model can be used to measure features such as height clearances, mounting locations for lighting fixtures 130, floor area of the stage 305, or the like digitally instead of by hand in the venue 300 itself. Further, data gathered during the above-described survey operation can be analyzed to identify variation in internal control loops of the UAV 140. These variations can be used to identify and measure any external disturbances on the flight of the UAV 140. For indoor venues 300, the disturbance can be attributed to airflow in the venue 300 instead of wind due to weather. This information can be utilized for determining proper placement for smoke and haze machines in the venue 300.

Figure 9:
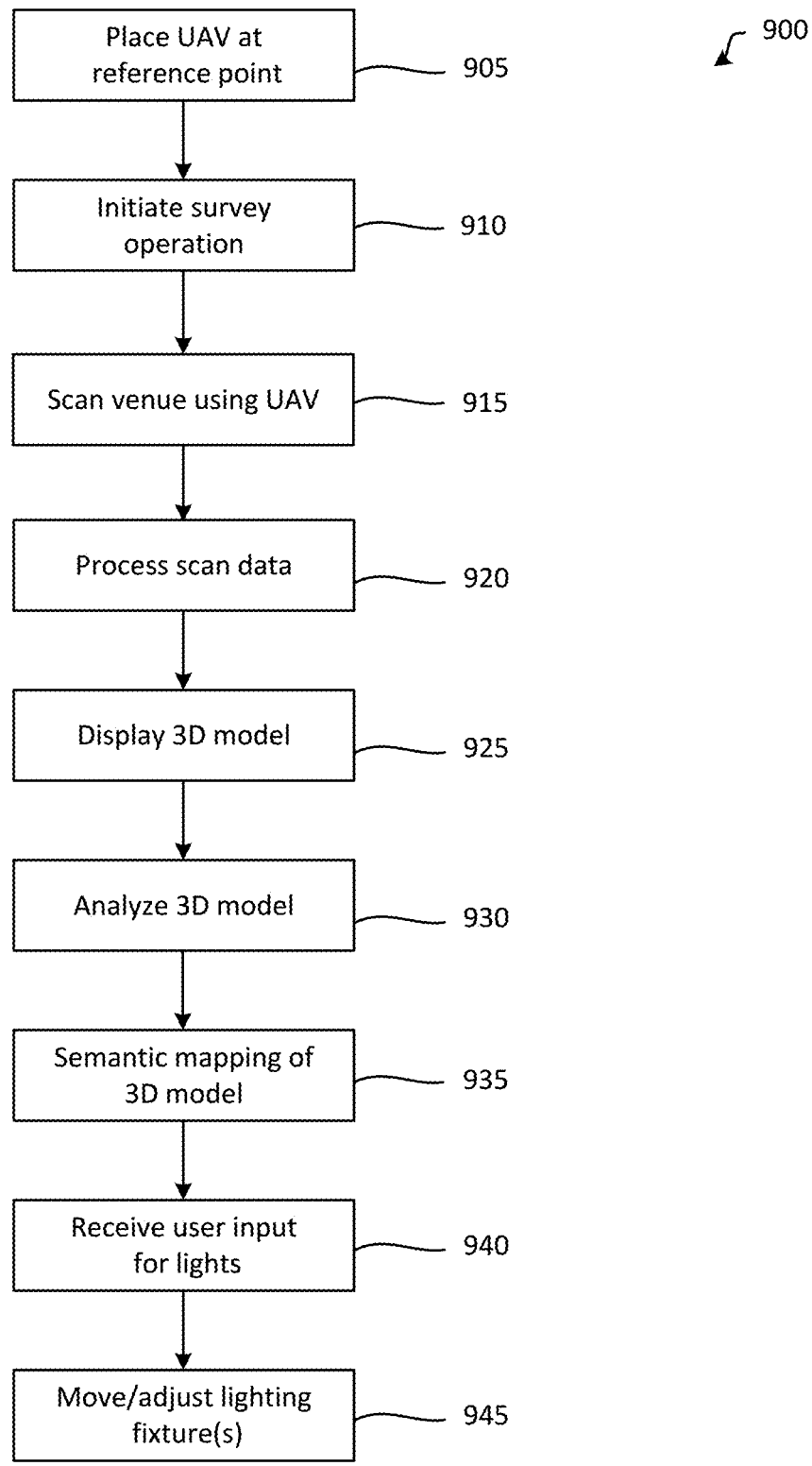
FIG. 9 illustrates a method of operating the system of FIG. 1 or the system of FIG. 1A.

FIG. 9 illustrates a method 900 of surveying the venue 300 with the UAV 140 to create a 3D model. The method 900 includes placing the UAV 140 at a known takeoff point (step 905). This takeoff point is on the stage 305, for instance. The UAV 140 calculates its location during the remainder of the method 900 based on this takeoff point. The method 900 further includes initiating a survey operation of the UAV 140 (step 910). This step includes starting the UAV 140 and moving the UAV 140 to a location to begin scanning the venue 300. The venue 300 is scanned in its entirety with sensors 135 using the UAV 140 (step 915). The data gathered by the sensors 135 aboard the UAV 140 during the survey operation is then processed by the controller 200 (step 920). The controller 200 generates and outputs a display of the 3D model on, for instance, the user input device 120 (step 925). Either automatically or upon initialization by the user, the method 900 continues by analyzing the 3D model for relevant features (step 930). This step, in some embodiments, utilizes control log data and other sensor data gathered during the method 900. The features discovered in the analysis of the 3D model include, for instance, measurements of the venue 300 and objects therein, location of airflows, temperatures of lighting fixtures 130, and the like. The method 900 further includes semantic mapping of the analyzed 3D model (step 935). The 3D model, in some embodiments, is updated to include labels for the components of the 3D model viewable upon selection, for instance. Other embodiments simply log the semantic information for data gathering purposes.

Some embodiments of the method 900 further include receiving user inputs from a user regarding lighting visuals and/or lighting settings for the lighting fixtures 130 via, for instance, the user input device 120 (step 940). The user input, in some embodiments, includes an interaction by the user with features of the display of the interactive three-dimensional environment. These interactions include, for instance, directing beams of light from a lighting fixture 130 to a destination indicated in the interactive three-dimensional environment, changing a brightness or color of a light projected by a lighting fixture 130 by adjusting dials or other controls displayed in the interactive three-dimensional environment, indicating a light destination by selecting a location on the stage 305 displayed within the interactive three-dimensional environment, or the like. Once the user input has been received (step 940), the method 900 further includes controlling lighting fixtures 130 to move or otherwise adjust in order to match the desired results indicated by the user through the user input (step 945). This step is accomplished by exporting a command signal (or a command string) to the lighting fixtures 130 either directly or indirectly through the control board 125 to control the lighting fixtures 130.

Thus, embodiments described herein provide methods and systems for surveying a venue, logging information related thereto, and controlling at least one lighting fixture according to the information. Various features and advantages of some embodiments are set forth in the following claims.

What is claimed is:

1. A method of surveying a venue, the method comprising:

scanning at least a portion of the venue using an unmanned aerial vehicle having at least one scanner;

converting scan data gathered by the at least one scanner into three-dimensional location data;

displaying the three-dimensional location data as a three-dimensional model;

analyzing the three-dimensional model; and
designating portions of the three-dimensional model with semantic mapping.

2. The method of claim 1, further comprising displaying the three-dimensional model as an interactive three-dimensional environment.

3. The method of claim 2, further comprising:
receiving a user input as an interaction with the interactive three-dimensional environment; and
changing a setting of at least one lighting fixture in response to the user input.

4. The method of claim 1, wherein:
converting the scan data includes determining a shape and a location of one or more lighting fixtures; and
displaying the three-dimensional location data includes displaying the shape and the location of the one or more lighting fixtures.

5. The method of claim 4, wherein:
analyzing the three-dimensional model includes identifying a type of the one or more lighting fixtures; and
designating portions of the three-dimensional model with semantic mapping includes designating the type of the one or more lighting fixtures.

6. The method of claim 1, wherein:
scanning the venue includes measuring temperature information of local areas in the venue; and
designating portions of the three-dimensional model with semantic mapping includes designating portions of the three-dimensional model with the temperature information.

7. The method of claim 1, wherein:
scanning the venue includes measuring airflow information of local areas in the venue;
converting the scan data includes determining airflow direction and airflow intensity of the local areas in the venue; and
designating portions of the three-dimensional model with semantic mapping includes designating portions of the three-dimensional model with the airflow information.

8. The method of claim 1, wherein:
analyzing the three-dimensional model includes identifying a seating area in the venue; and
designating portions of the three-dimensional model with semantic mapping includes designating the seating area.

9. The method of claim 1, wherein:
analyzing the three-dimensional model includes identifying a set piece; and
designating portions of the three-dimensional model with semantic mapping includes designating a type of the set piece.

10. The method of claim 1, wherein:
analyzing the three-dimensional model includes identifying a restricted area; and
designating portions of the three-dimensional model with semantic mapping includes designating the restricted area.

11. The method of claim 1, wherein:
analyzing the three-dimensional model includes identifying a rigging point; and
designating portions of the three-dimensional model with semantic mapping includes designating the rigging point.

12. The method of claim 1, wherein:
scanning the venue includes measuring acoustic properties of local areas in the venue; and
designating portions of the three-dimensional model with semantic mapping includes designating portions of the three-dimensional model with the acoustic properties.

13. A system for surveying a venue, the system comprising:
an unmanned aerial vehicle;
at least one sensor connected to the unmanned aerial vehicle; and
a controller configured to:
direct the unmanned aerial vehicle about the venue;
operate the at least one sensor to gather sensor data;
receive a signal from the at least one sensor related to the sensor data;
translate the sensor data into three-dimensional location data;
output a display of the three-dimensional location data as a three-dimensional model; and
execute semantic mapping of the three-dimensional model.

14. The system of claim 13, wherein the three-dimensional model includes an interactive three-dimensional environment.

15. The system of claim 14, further comprising:
at least one lighting fixture; and
wherein the controller is further configured to:
receive user input as an interaction with the interactive three-dimensional environment; and
change a lighting setting of the at least one lighting fixture in response to the user input.

16. The system of claim 13, wherein the at least one sensor includes a camera.

17. The system of claim 13, wherein the at least one sensor includes a temperature sensor.

18. The system of claim 13, wherein the controller is further configured to automatically direct the unmanned aerial vehicle about the venue in an autopilot mode.

19. The system of claim 13, wherein the controller is further configured to track a flight path of the unmanned aerial vehicle while operating the at least one sensor.

20. The system of claim 19, wherein the controller is further configured to determine airflow characteristics of the venue based on the flight path and the sensor data.

\* \* \* \* \*